United States Patent [19]

Tamai et al.

[11] 4,005,995
[45] Feb. 1, 1977

[54] PROCESS FOR PRODUCING A GASEOUS PRODUCT FROM CARBONACEOUS MATERIAL

[75] Inventors: Yasukatsu Tamai; Yoshiyuki Nishiyama; Minoru Mitida, all of Sendai, Japan

[73] Assignee: Tohoku University, Japan

[22] Filed: Oct. 1, 1975

[21] Appl. No.: 618,583

[30] Foreign Application Priority Data

Mar. 26, 1975 Japan ............................. 50-036497

[52] U.S. Cl. .............................. 48/197 R; 48/202; 48/206; 48/210; 252/373

[51] Int. Cl.$^2$ .......................................... C10J 3/06

[58] Field of Search ................ 48/197 R, 202, 203, 48/206, 210; 299/5; 44/1 R, 1 B; 252/373; 208/8; 201/9

[56] References Cited

UNITED STATES PATENTS

| | | | |
|---|---|---|---|
| 2,133,280 | 10/1938 | Burk | 208/8 |
| 2,453,544 | 11/1948 | Schabelitz | 201/9 |
| 2,683,657 | 7/1954 | Garbo | 48/202 |
| 3,536,589 | 10/1970 | Voit et al. | 201/9 |
| 3,558,468 | 1/1971 | Wise | 208/8 |
| 3,850,477 | 11/1974 | Aldrich et al. | 299/5 |
| 3,920,418 | 11/1975 | Rice | 48/210 |

OTHER PUBLICATIONS

Coal Gasification, Lester G. Massey; "Catalysis of Coal Gasification at Elevated Pressures," Haynes et al., pp. 179-190.

Primary Examiner—S. Leon Bashore
Assistant Examiner—Peter F. Kratz
Attorney, Agent, or Firm—Burgess, Dinklage & Sprung

[57] ABSTRACT

A process for producing a gaseous product from carbonaceous material which is solid at room temperature comprising:

pretreating the particulate carbonaceous material with liquid ammonia at room temperature to 150° C. to extract out of said carbonaceous material substantially all ammonia-solubles; and treating the residual carbonaceous material with a gasifying agent at a temperature of 400° to 1,000° C. under a pressure ranging from atmospheric pressure to super-atmospheric pressure in the presence or absence of a catalyst to obtain a gaseous product.

With such process, there is obtained a high gasification efficiency, with avoidance of caking and coking the carbonaceous material.

9 Claims, 7 Drawing Figures

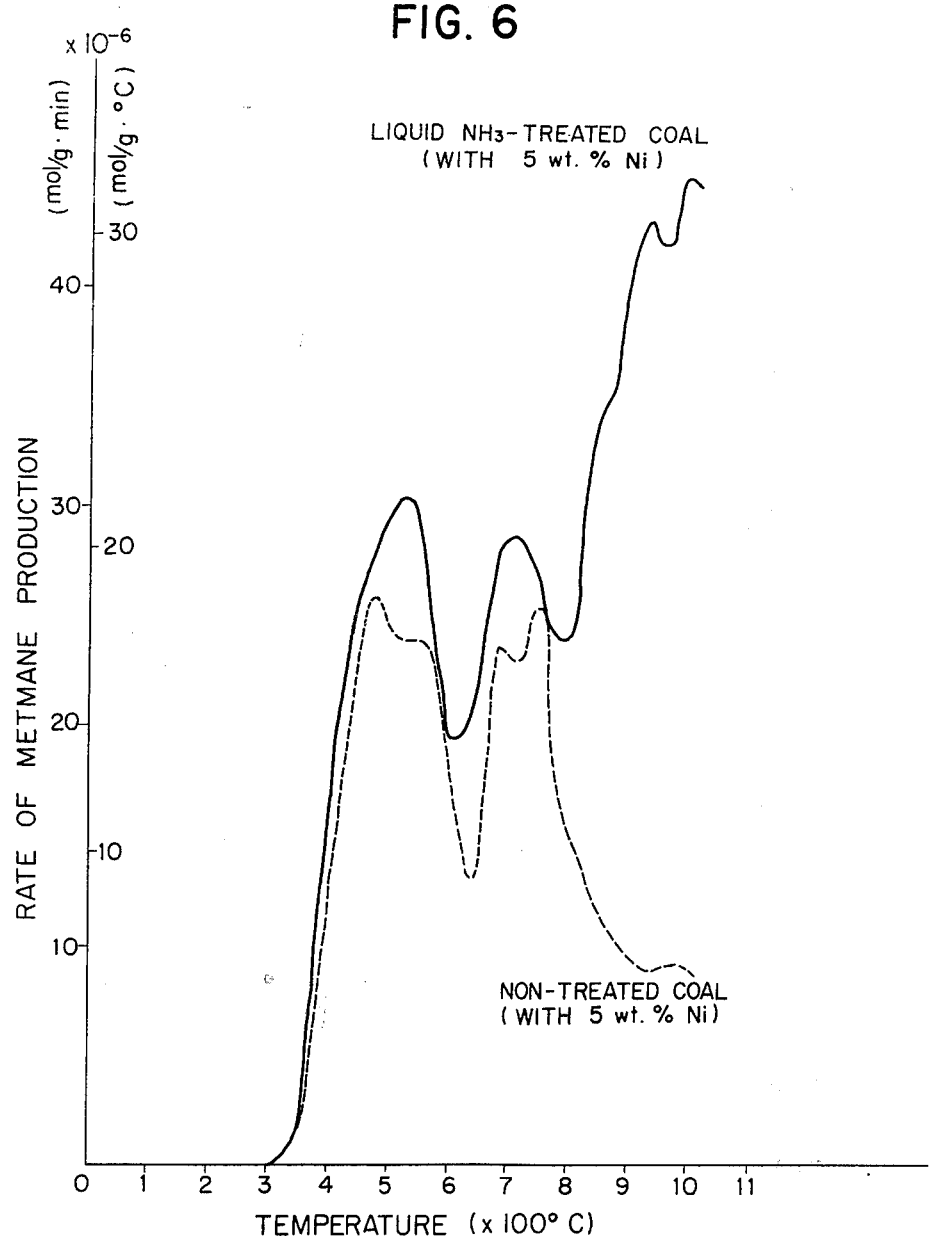

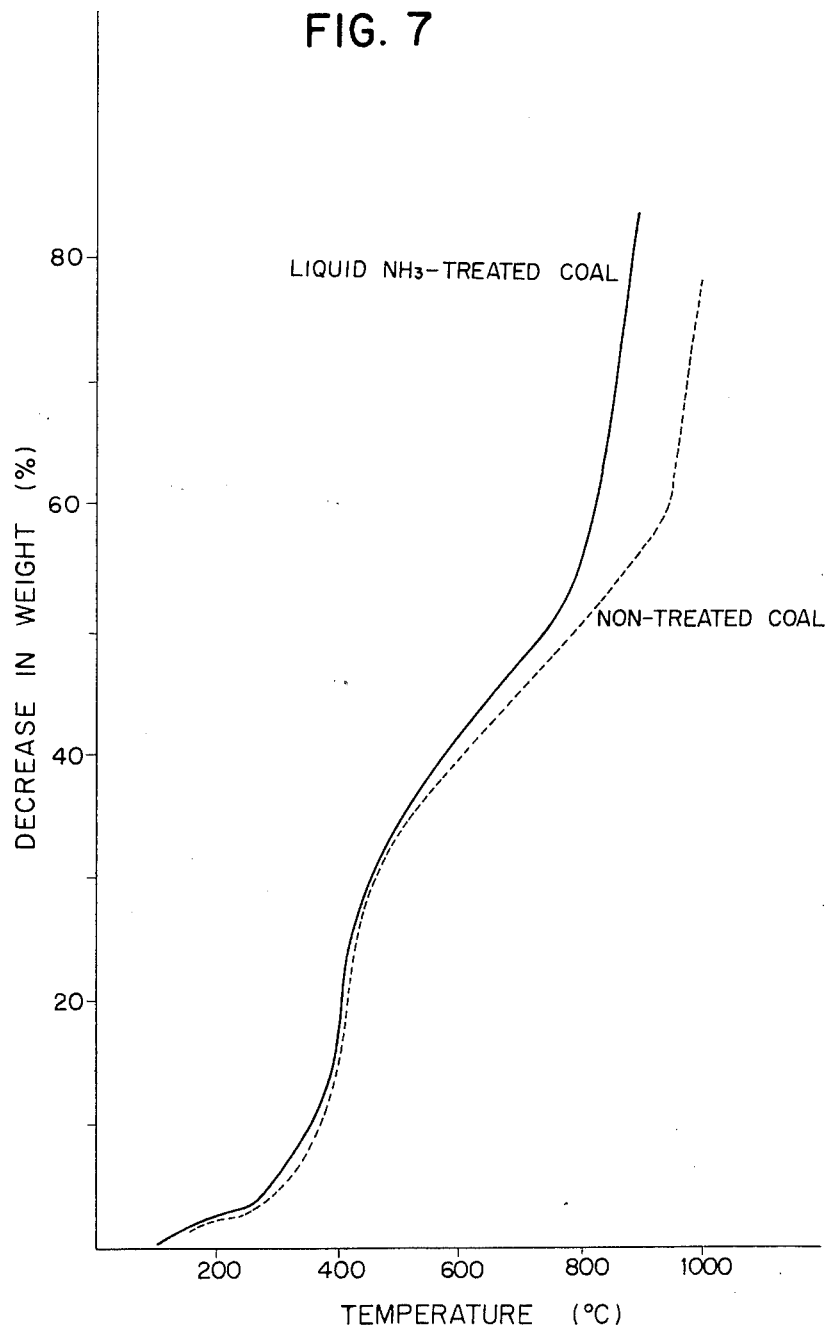

PROCESS FOR PRODUCING A GASEOUS PRODUCT FROM CARBONACEOUS MATERIAL

This invention relates to a process for producing a gaseous product from carbonaceous material. More particularly, this invention is concerned with a process for producing a gaseous product from carbonaceous material which is solid at room temperature, characterized in that the carbonaceous material is treated or contacted with liquid ammonia before it is treated with a gasifying agent for gasification.

Heretofore, there have been proposed various methods for gasification of a carbonaceous material, for example a coal to produce a mixed gas containing methane, hydrogen and carbon monoxide. With such conventional methods, however, various difficulties in respect of gasification conditions, and structure of the reactor have been encountered according to specific properties of coal to be subjected to a gasification treatment, especially volatile components, caking degree, and degrees of melting and softening points of the ash. Illustratively stated, there are known a one-stage process in which coal is continuously or cyclically treated directly with a mixture of oxygen or an oxygen-containing gas and steam at a temperature as high as or higher than 1,000° C to effect gasification, and a two-stage process which comprises, in combination, the steps of treating a coal with hydrogen and/or steam at a high temperature of 900° to 1,000° C or more to obtain a product gas and char and treating the resultant char with a mixture of oxygen or an oxygen-containing gas and steam at a high temperature of more than 1,000° C to obtain a high temperature gas containing hydrogen which gas is to be used in the first step. In any of these conventional methods, the coal is necessarily treated at a high temperature and, therefore, there are brought about problems, e.g. caking and coking of the coal at such high temperature and need of special material for making the reactor.

With a view that, in the gasification process, it is advantageous to effect a gasification reaction at a temperature as low as possible, lower than 1,000° C and caking and coking of the carbonaceous material should be avoided, the present inventors have made extensive and intensive studies. It has been found by the present inventors that when a carbonaceous material is pretreated with liquid ammonia before it is treated with a gasifying agent for gasification, the carbonaceous material is changed to a state in which not only the specific surface area of the material is increased but also the material has a distinguishing structure suitable for a gasification treatment. When such pretreated carbonaceous material is subjected to a gasification treatment, the gasification effectively proceeds at a temperature as low as 1,000° C or less with avoidance of caking and coking of the material.

Accordingly, it is a primary object of this invention to provide a process for producing a gaseous product from a carbonaceous material which process is capable of effectively gasifying the material, with avoidance of caking and coking of the material.

Another object of the invention is to provide a process as described which can be effected at a relatively low temperature.

A further object of this invention is to provide a process of the above described type which can be conducted at low cost.

The foregoing and other objects, features and advantages of the present invention will be apparent to those skilled in the art from the following description and appended claims taken in connection with the accompanying drawings in which:

FIG. 6 is a graph showing the result of Example 1; and

FIG. 7 is a graph showing the result of Example 2.

According to the present invention, there is provided a process for producing a gaseous product from carbonaceous material which is solid at room temperature comprising:

pretreating the perticulate carbonaceous material with liquid ammonia at room temperature to 150° C to extract out of said carbonaceous material substantially all ammonia-solubles, separating the carbonaceous material from the liquid ammonia; and treating the resultant carbonaceous material with a gasifying agent at a temperature of 400° to 1,000° C under a pressure ranging from atmospheric pressure to super-atmospheric pressure in the presence or absence of a catalyst to obtain a gaseous product.

Figure 1:
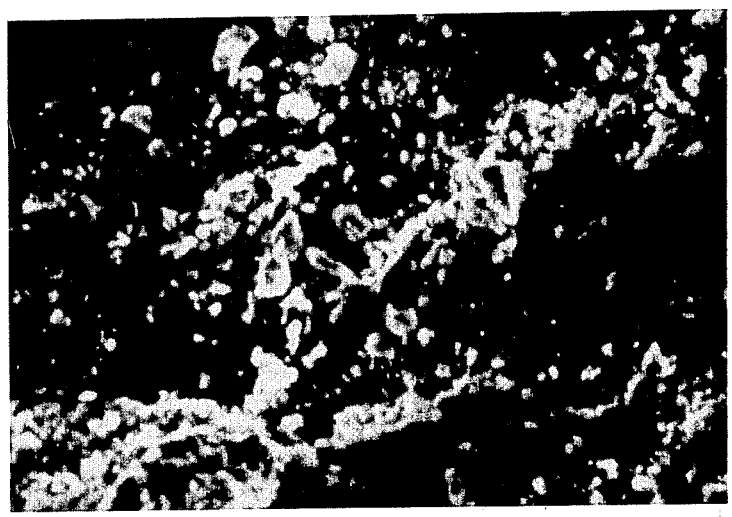
FIG. 1 is an electron microscopic picture ($\times 400$) of the untreated coal employed in Example 1.
Figure 2:
FIG. 2 is an electron microscopic picture ($\times 800$) of the treated coal employed in Example 1.

As the carbonaceous materials to be employed in the present invention, there are mentioned lignite, bituminous coal, semi-bituminous coal, anthracite, semianthracite, tar pitch, asphalt, petroleum cokes, mixtures thereof, and the like. According to the process of the present invention, the carbonaceous material is contacted with liquid ammonia to extract out of the carbonaceous material a part of its components into the ammonia. According to IR absorption spectrum, the extract is comprised mainly of alkyl structures and does not contain aromatic hydrocarbons. The reason why the carbonaceous material pretreated with liquid ammonia is effectively gasified is not yet known. Illustratively stated, it is not yet known whether the extract contributes to elimination of materials causing caking and coking of the coal or the pretreatment causes the internal structure of the carbonaceous material to be destroyed and changed to the state suitable for gasification, but it can be said that the pretreatment of carbonaceous material with liquid ammonia until the amount of extraction substantially reaches a plateau range (FIG. 3) causes the carbonaceous material to change to the state or structure (FIG. 2) suitable for gasification.

The carbonaceous material to be treated according to the process of the present invention is suitably particulate. The particle size is not critical but is preferably in the range of 5 to 20 Tyler mesh.

The contacting or pretreatment of carbonaceous material with liquid ammonia is effected by immersion, washing or mixing. Thereafter, the pretreated carbonaceous material is separated from the liquid ammonia by a customary method.

The method, time and number of times of pretreatment as well as the weight ratio of liquid ammonia to carbonaceous material vary depending on the kind, shape and properties of the carbonaceous material. In practicing the process of the present invention, the desired effect of the present invention can be attained when the carbonaceous material is pretreated with liquid ammonia until substantially all ammonia-solubles are extracted. This means that the extraction should be done until the extraction with liquid ammonia substantially reaches saturation (e.g. plateau in FIG. 3). From an economical point of view, the extraction to an extent that at least 80% of saturation is attained is effective for the present invention.

The term "liquid ammonia" is used herein to mean ammonia which is liquid or in a super critical state at pretreating conditions, namely, temperature and pressure. Accordingly, instead of liquid ammonia, any compounds capable of decomposing and, as a result, forming ammonia at pretreating conditions may be employed.

The higher the temperature for the pretreatment, the shorter the required time for the pretreatment. However, if too high a temperature is employed, it is not favorable from an economical point of view. Accordingly, 50° to 150° C is preferably employed.

In the following, there are shown experiments in which two kinds of bituminous coals having different carbonization degrees are used.

Table 1

| Kind of coal | Employed coals | | | | |
|---|---|---|---|---|---|
| | | | | Composition (Wt %) | |
| | C | H | N | O and S | Ash |
| A (Yubari-Shin Coal available from Hokkaido Tanko Kisen Co., Ltd.) | 75.9 | 6.1 | 2.1 | 7.4 | 8.5 |
| B (Minami-Oh-Yubari Coal available from Mitsubishi-Oh-Yubari Co., Ltd.) | 81.1 | 6.0 | 1.8 | 5.1 | 6.0 |

30g. of coal (9–16 Tyler mesh) were charged in a pressure vessel and the vessel was evacuated. Thereafter, liquid ammonia was introduced. The temperature was raised and then maintained for a predetermined period of time. Weight ratio (liquid ammonia/coal): 1–8. Temperature and pressure: 50° C 19 atm, 100° C 62 atm, 120° C 90 atm, 150° C 143 atm. Immersion time: 0.5–3 hours. Number of times of immersion: 1–5.

Figure 3:
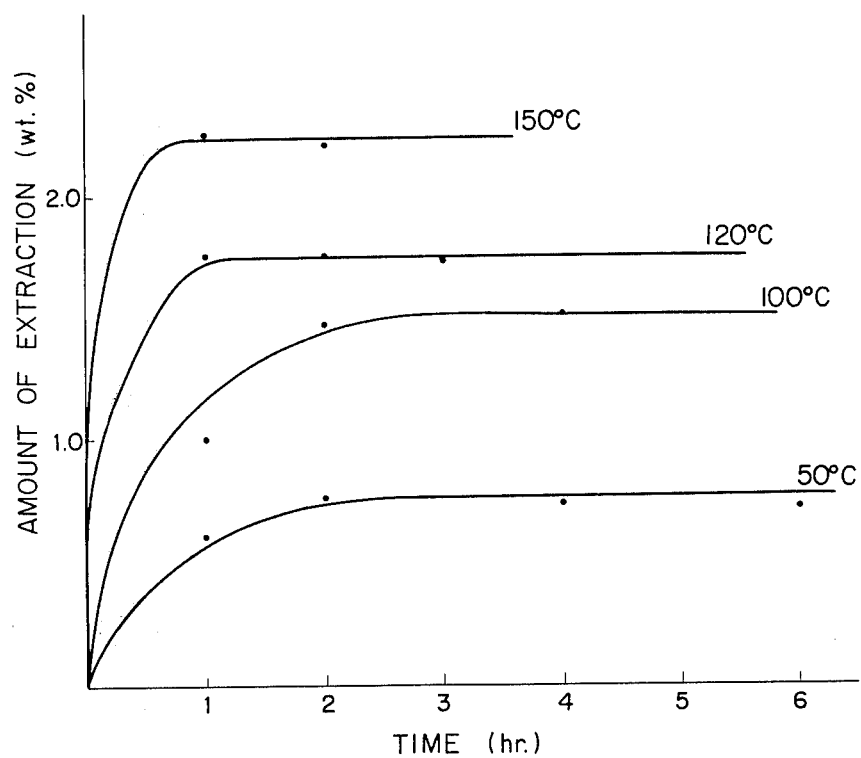
FIG. 3 is a graph showing the relationship between the amount of extraction from a coal by pretreatment with liquid ammonia and the pretreatment time.

When the weight ratio is 4, the relationship between the amount of extraction by 1-time immersion and the period of time is shown in FIG. 3.

Figure 4:
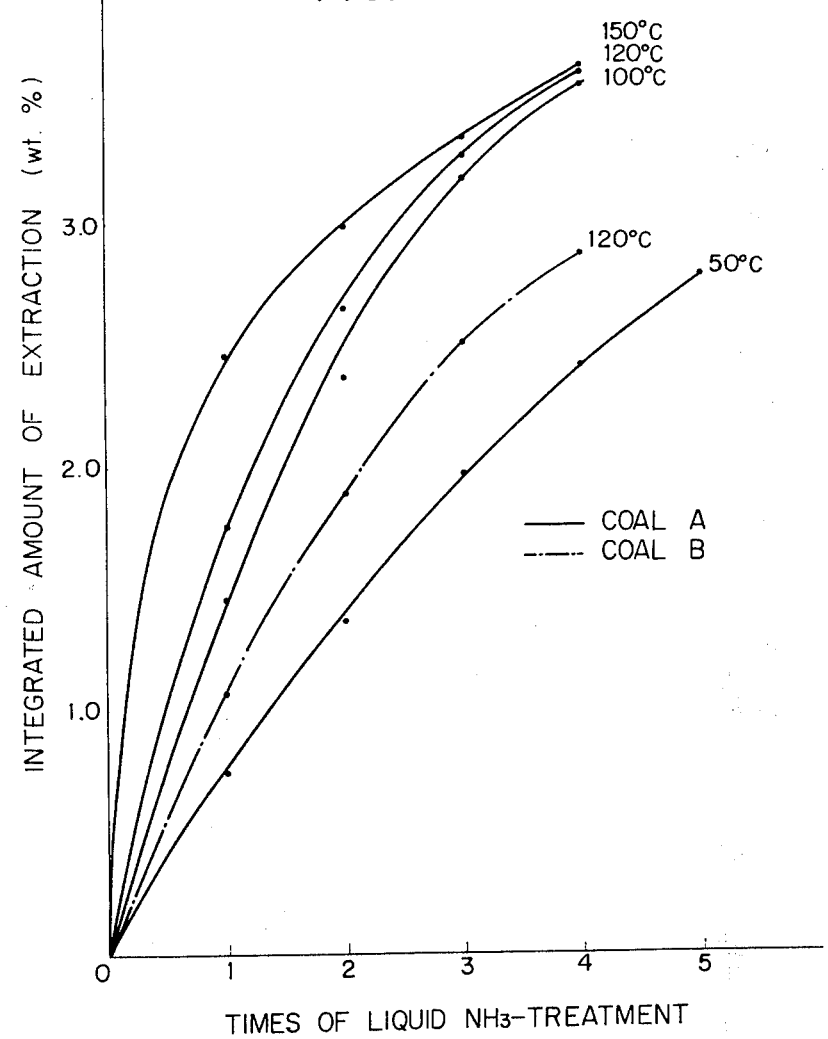
FIG. 4 is a graph showing the relationship between the integrated amount of extraction from the coal by pretreatment with liquid ammonia and the number of times of the treatment.

Even though the weight ratio is increased to 8, the amount of extract by 1-time immersion did not change. The increase in number of times of pretreatments with fresh liquid ammonia brought about better results. When the number of times of pretreatments are increased, with a weight ratio of 4, the integrated amount of extraction is shown in FIG. 4. In this case, the pretreated coal became porous. The BET specific surface area of Coal A was 0.2–0.5 m$^2$/g (that of non-treated coal was 0.15 m$^2$/g) and the BET specific surface area of coal B was 0.4–0.6 m$^2$/g (that of non-treated coal was 0.15 m$^2$/g).

As is apparent from the foregoing, the carbonaceous material pretreated according to the present invention shows a distinguishable structure, increases in specific surface area and does not show caking at high temperature. Therefore, it is easily expected that when the pretreated carbonaceous material is subjected to a gasification process, not only will there be obtained a high gasification efficiency at a temperature lower than that of a conventional process but also caking and coking will be avoided.

The pretreated carbonaceous material can be effectively treated in any kind of gasification process. When hydrogen, and steam, carbon dioxide and/or oxygen (or oxygen-containing gas) are employed, a mixture of methane and hydrogen, and a hydrogen and carbon monoxide-enriched product gas are obtained, respectively.

The present process can be practiced without use of any catalyst. However, when a suitable catalyst is employed, better results are obtained. In the process of the present invention, the group VIII transition metals including Ru, Rh, Pd, Ir, Pt, Fe, Co and Ni show high catalytic activities. Such metals may be used in any form of metal, oxide and inorganic and organic salts. Representative inorganic and organic salts include chlorides, nitrates, carbonates, formates, oxalates, acetates and mixtures thereof. The catalyst may be admixed with a carbonaceous material before or after the carbonaceous material is treated with liquid ammonia, but preferably after pretreatment with liquid ammonia. The amount of catalyst is preferably 0.5 to 5% by weight, based on the carbonaceous material, in terms of the amount of metal.

The catalytic activity of such catalyst is exerted by putting the catalyst on the carbonaceous material, followed by reduction to metal. When a metal is employed as a catalyst or hydrogen is employed as a gasifying agent, such reduction process is of course unnecessary. For putting the catalyst on the carbonaceous material, powdered catalyst may be mixed with the particulate carbonaceous material or the solution of the catalyst in a suitable solvent such as water, aqueous ammonia solution or ethyl alcohol may be mixed with the carbonaceous material and dried. In any case, it is necessary for the catalyst to be distributed on and adhered to the carbonaceous material.

The order of activity of the above-mentioned catalyst is shown below by metal, employing hydrogen as the gasifying agent.

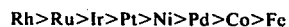

Rh>Ru>Ir>Pt>Ni>Pd>Co>Fe

Table 2

When an active charcoal and hydrogen are employed as a carbonaceous material and a gasifying agent, respectively, the gasification rates obtained from the pretreated active charcoal are shown below

| Metal | Gasification ~750° C | rate (%) ~1,000° C |
|---|---|---|
| Rh | 100 | 100 |
| Ru | 100 | 100 |
| Ir | 100 | 100 |
| Pt | 74 | 100 |
| Ni | 55 | 100 |
| Pd | 0.6 | 32 |
| Co | 0.2 | 28 |
| Fe | 0 | 24 |

Table 2-continued

When an active charcoal and hydrogen are employed as a carbonaceous material and a gasifying agent, respectively, the gasification rates obtained from the pretreated active charcoal are shown below

| Metal | Gasification rate (%) ~750° C | ~1,000° C |
|---|---|---|
| None | 0 | 11 |

When steam or carbon dioxide is employed as a gasifying agent, the order is:

| $H_2O$ | Rh>Ru>Ir>Pt>Ni>Co>Fe>Pd |
|---|---|
| $CO_2$ | Ir>Ru>Rh>Pt>Ni>Co>Fe>Pd |

Even when the same metal is employed, the catalytic activity varies depending on the kind of salt. For example, when Ni is employed, the order is:

Nitrate > Chloride >> Acetate > Formate > Oxalate > Oxide > Pulverized metal

In the gasification process, the pressure may be atmospheric pressure to super-atmospheric pressure, preferably 1 to 200 atm, and the temperature may be 400° to 1,000° C, preferably 700° to 1,000° C.

Using the aforementioned coal A and hydrogen, the gasification experiments were conducted as follows.
1. non-treated coal without catalyst
2. pretreated coal (liquid $NH_3$/coal = 4), 120° C, 90 atm, 4 immersions, without catalyst
3. non-treated coal with 5 wt % Ni
4. pretreated coal in (2) above, with 5 wt % Ni.

Figure 5:
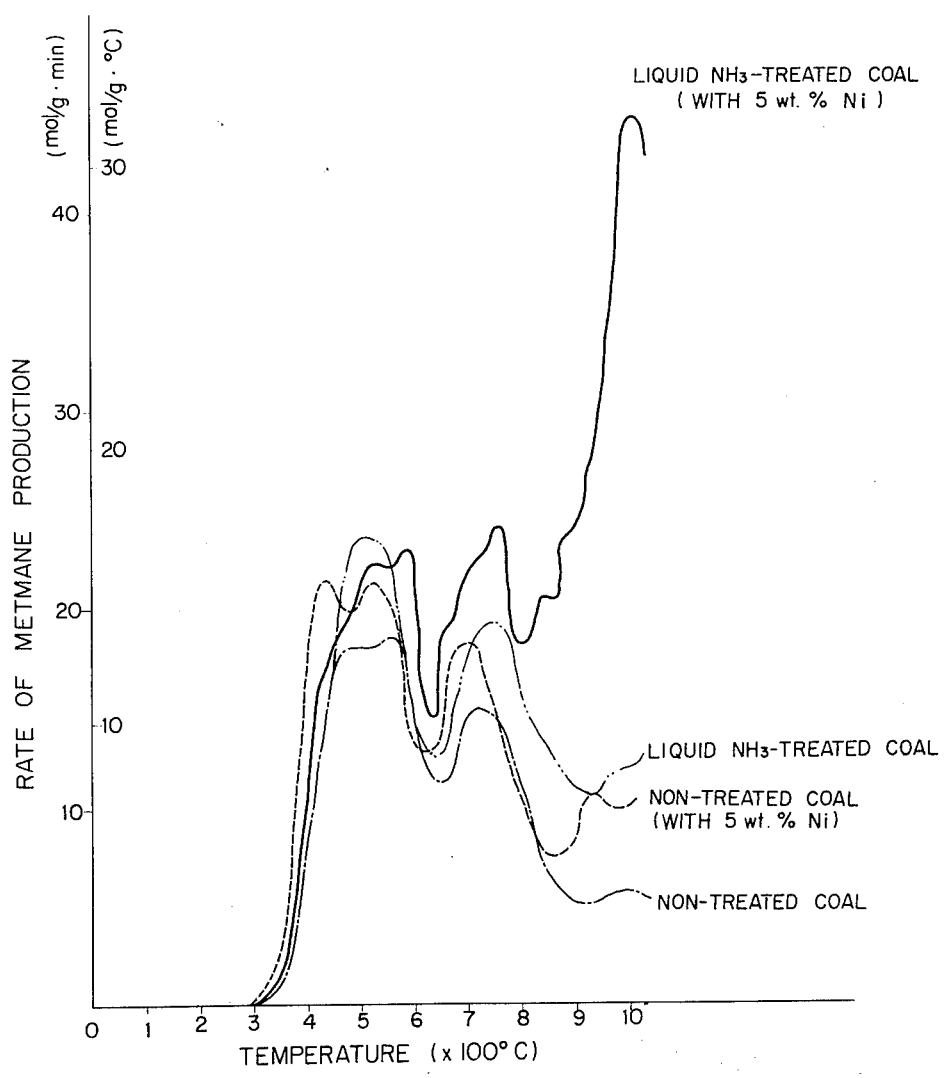
FIG. 5 is a graph showing the relationship between the rate of gas production and the temperature of the gasification.

The results are shown in FIG. 5 and Table 3.

Table 3

(Hydrogenation at up to 1,020° C)

| Experiment | Wt % Total decrease in amount | Amount of tar | Amount of methane |
|---|---|---|---|
| 1) above | 46.1 | 20.6 | 8.6 |
| 2) " | 45.4 | 11.6 | 11.5 |
| 3) " | 50.5 | 18.8 | 10.8 |
| 4) " | 51.4 | 13.8 | 17.3 |

As is apparent from FIG. 5 and Table 3,, the pretreated coal shows a high rate of methane production, especially at above 700° C as compared with non-treated coal. In addition, the pretreated coal shows reduction in formation of tar.

EXAMPLE 1

Powder (10–15 Tyler mesh) of Akabira coal (carbon content: about 70%; ash content: 10%) available from Sumitomo Sekitan was immersed in liquid ammonia in a weight ratio of 4:1 (liquid ammonia: coal) and heated at a temperature of 120° C under a pressure of 90 atm. for 30 minutes. This operation was repeated five times.

To the thus treated coal was added nickel chloride (using 0.25 wt % aqueous solution) in an amount of 5% by weight, based on the coal, in terms of amount of nickel and the materials were charged in a fixed-bed reactor. The materials in the reactor were then heated up to 1,000° C at a temperature elevation rate of 80° C/h while hydrogen gas was supplied thereto at a rate of 0.1 l/m under atmospheric pressure and the rate of methane production was measured.

On the other hand, coal which was not treated with liquid ammonia was subjected to gasification under the same conditions and the results are compared and summarized in FIG. 6.

In FIG. 6, the solid line shows that coal treated according to the present invention and the broken line shows the untreated coal. As is apparent from FIG. 6, the treated coal constantly shows a higher rate of methane generation as compared with the untreated coal and, especially at a temperature higher than 700° C, the treated coal shows a remarkably high rate of methane production and was not coked at such a high temperature.

EXAMPLE 2

Powder (10–15 Tyler mesh) of coal A (mentioned before) was immersed in liquid ammonia in a weight ratio of 4:1 (liquid ammonia: coal) and heated at a temperature of 120° C under a pressure of 90 atm. for 30 minutes. This operation was repeated five times.

To the thus treated coal was added nickel chloride (using 0.25 wt % aqueous solution) in an amount of 1% by weight, based on the coal, in terms of amount of nickel, and the materials were charged in a fixed-bed reactor. The materials in the reactor were then heated up to 900° C at a temperature elevation rate of 80° C/h while hydrogen gas was supplied at a rate of 1 l/m under a pressure of 10 atm. and weight decrease of the coal was measured.

On the other hand, coal which was not treated with liquid ammonia was subjected to gasification up to a temperature of 1,000° C under the same conditions and the results were compared and summarized in FIG. 7.

In FIG. 7, the solid line shows the coal treated according to the present invention and the broken line shows the untreated coal. It can be seen from FIG. 7 that the treated coal shows a large decrease in weight as compared with the untreated coal. Especially at a temperature around or higher than 800° C, the treated coal underwent a drastic gasification and, at a temperature of 900° C, it underwent a weight decrease of 80%, whereas the untreated coal underwent only such gasification corresponding to a weight decrease of 55%.

EXAMPLE 3

Treated coal (BET specific surface area: 0.35 m²/g) prepared from coal A pulverized into a particle size of 10 Tyler mesh and treated with liquid ammonia at a weight ratio of 4:1 (liquid ammonia: coal) at a temperature of 120° C under a pressure of 90 atm. two times according to the method of the present invention and carbonized coal prepared from coal A of the same particle size previously air-oxidized at a temperature of 400° C for 20 minutes were gasified under the following conditions. The wt % ultimate analysis of the treated coal of the present invention was as follows: C 79.7, H 5.9, N 1.3, O and S 5.0 and ash 8.1 and the carbonized coal ultimate analysis as follows: C 75.2, H 5.0, N 2.2, O and S 8.9 and ash 8.7. The coals were continuously charged into a moving bed type reactor at its upper portion and a gasifying agent such as a mixed gas of oxygen (oxygen:coal = 0.35 gr/gr) and steam (steam:coal = 1.2 gr/gr) was supplied thereto in its lower portion. The gasification temperature, pressure and result are summarized in the following table, wherein the composition of the produced gas shows the composition of dry gas obtained after washing of the gas produced by the reaction.

|  | treated coal of the present invention | | dry-distilled goal | |
|---|---|---|---|---|
| temperature ° C | 950 | | 1050 | |
| pressure atm. | 10 | | 10 | |
| produced gas composition (vol %) | | | | |
| CH₄ | 14.4 | ⎫ | 11.4 | ⎫ |
| CO | 19.7 | ⎬ 74.4 | 28.5 | ⎬ 70.7 |
| H₂ | 40.3 | ⎭ | 40.8 | ⎭ |
| CO₂ | 21.6 | | 14.2 | |
| others | 4.0 | | 5.1 | |
| residual carbon in the ash (wt %) | 28 | | 44 | |
| carbon efficiency (gasification efficiency) | 96 | | 91 | |

As can be seen from the above table, the treated coal according to the present invention showed high gasification efficiency with a gasification temperature lower by 100° C than the comparison coal and had higher contents of effective components such as $CH_4$, CO or $H_2$ in the produced gas.

What is claimed is:

1. A process for producing a gaseous product from particulate carbonaceous material which is solid at room temperature comprising:
    pretreating the particulate carbonaceous material with liquid ammonia at room temperature to 150° C to extract out of said carbonaceous material at least about 80% of the substances extractable with liquid ammonia;
    separating the carbonaceous material from the liquid ammonia; and
    treating the resultant carbonaceous material with a gasifying agent at a temperature of 400° to 1,000° C under a pressure ranging from atmospheric pressure to super-atmospheric pressure in the presence or absence of a catalyst to obtain a gaseous product.

2. A process according to claim 1 wherein said carbonaceous material is a member selected from the group consisting of lignite, bituminous coal, semi-bituminous coal, anthracite, semi-anthracite, tar pitch, asphalt, petroleum cokes and mixtures thereof.

3. A process according to claim 1 wherein the pretreatment of the particulate carbonaceous material with liquid ammonia is effected at 50° to 150° C.

4. A process according to claim 1 wherein said gasifying agent is a member selected from the group consisting of hydrogen, steam, carbon dioxide, oxygen and mixtures thereof.

5. A process according to claim 1 wherein the pretreatment of the carbonaceous material with liquid ammonia is effected by immersion, washing or mixing.

6. A process according to claim 1 wherein said catalyst is a member selected from the group consisting of metallic Ru, Rh, Pd, Ir, Pt, Fe, Co and Ni; and oxides, inorganic and organic salts thereof.

7. A process according to claim 6 wherein said inorganic and organic salts comprise chlorides, nitrates, carbonates, formates, oxalates, acetates and mixtures thereof.

8. A process according to claim 6 wherein said catalyst is present in an amount of 0.5 to 5 % by weight, based on the weight of the carbonaceous material, in terms of the amount of metal.

9. A process according to claim 1 wherein the treating of the resultant carbonaceous material with a gasifying agent is effected under a pressure of 1 to 200 atm.

* * * * *

UNITED STATES PATENT AND TRADEMARK OFFICE
CERTIFICATE OF CORRECTION

PATENT NO. : 4,005,995

DATED : February 1, 1977

INVENTOR(S) : Yasukatsu Tamai et al

It is certified that error appears in the above-identified patent and that said Letters Patent are hereby corrected as shown below:

First page of Patent, Item [73] Assignee, cancel "Tohoku University, Japan" and substitute therefor -- President of Tohoku University, Japan--

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,005,995
DATED : February 1, 1977
INVENTOR(S) : Yasukatsu Tamai et al It is certified that error appears in the above-identified patent and that said Letters Patent are hereby corrected as shown below:

Page 1, Item [75] Inventors: correct spelling of last name of third inventor - cancel "Mitida" and substitute -- Matida --.

Signed and Sealed this

Twenty-second Day of November 1977

[SEAL]

Attest:

RUTH C. MASON
Attesting Officer

LUTRELLE F. PARKER
Acting Commissioner of Patents and Trademarks